United States Patent [19]

Branson

[11] 3,845,275
[45] Oct. 29, 1974

[54] COMPUTER COOKING MEANS
[75] Inventor: Charles D. Branson, Greensburg, Pa.
[73] Assignee: Robertshaw Controls Company, Richmond, Va.
[22] Filed: Mar. 22, 1972
[21] Appl. No.: 236,840

[52] U.S. Cl. ................ 235/61 A, 219/490, 99/332
[51] Int. Cl. ............................................. G01g 1/00
[58] Field of Search .................... 235/61 A, 61 R; 219/489–493; 236/46; 99/325–332

[56] References Cited
UNITED STATES PATENTS

| | | | |
|---|---|---|---|
| 3,083,272 | 3/1963 | Stolle | 219/493 X |
| 3,286,924 | 11/1966 | Banathy | 219/493 X |
| 3,358,924 | 12/1967 | Goodhouse et al. | 236/46 |
| 3,688,978 | 9/1972 | Goodhouse et al. | 235/61 A |
| 3,731,059 | 5/1973 | Willson | 235/61 A |
| 3,746,250 | 7/1973 | Goodhouse et al. | 235/61 A |

Primary Examiner—Richard B. Wilkinson
Assistant Examiner—Vit W. Miska
Attorney, Agent, or Firm—Candor, Candor & Tassone

[57] ABSTRACT

A cooking computer for determining the cooking operation of a cooking apparatus. The computer has a manually settable weight input means for indicating a single selected indicated weight applicable to all meat items and corresponding to the weight of a particular meat item to be cooked with the weight means including a movable and settable part thereof. A manually settable second input means for indicating a selected variable other than the weight of the meat and being operatively associated with the weight input means, the second input means including a movable and settable part thereof. The movable and settable part of one of the input means is movable and settable in relation to the set position of the movable and settable part of the other input means. The computer has a time period output means operatively associated with the input means to provide as an output, a cooking time period for the particular meat item computed as a function from both of the input means.

5 Claims, 9 Drawing Figures

| DEGREE OF DONENESS | | |
|---|---|---|
| BEEF | RARE | 0-5 |
| BEEF | MED. | 6-14 |
| BEEF | WELL | 15-20 |
| HAM (fresh) | WELL | 20 |
| PORK (shoulder) | WELL | 20 |
| LAMB | | 7-14 |
| CHICKEN (stuffed or not stuffed) | WELL | 14 |
| TURKEY (not stuffed) | WELL | 1 |
| TURKEY (stuffed) | WELL | 10 |

PATENTED OCT 29 1974　　　　3,845,275
SHEET 2 OF 3
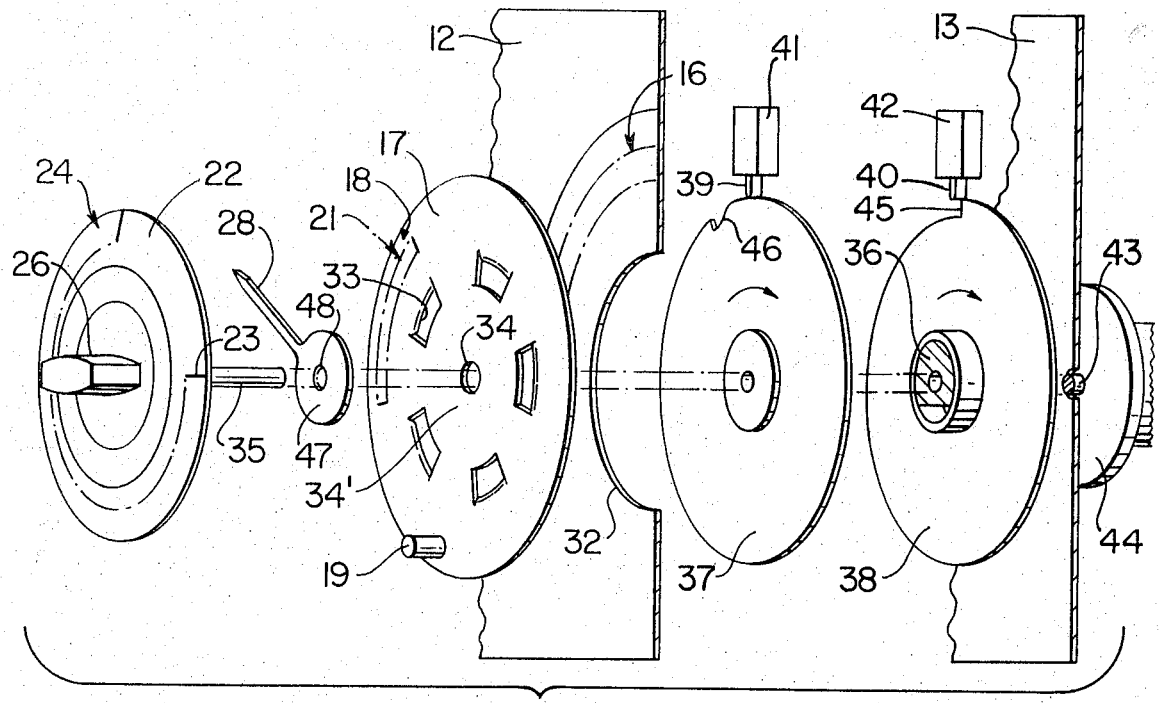
FIG. 6
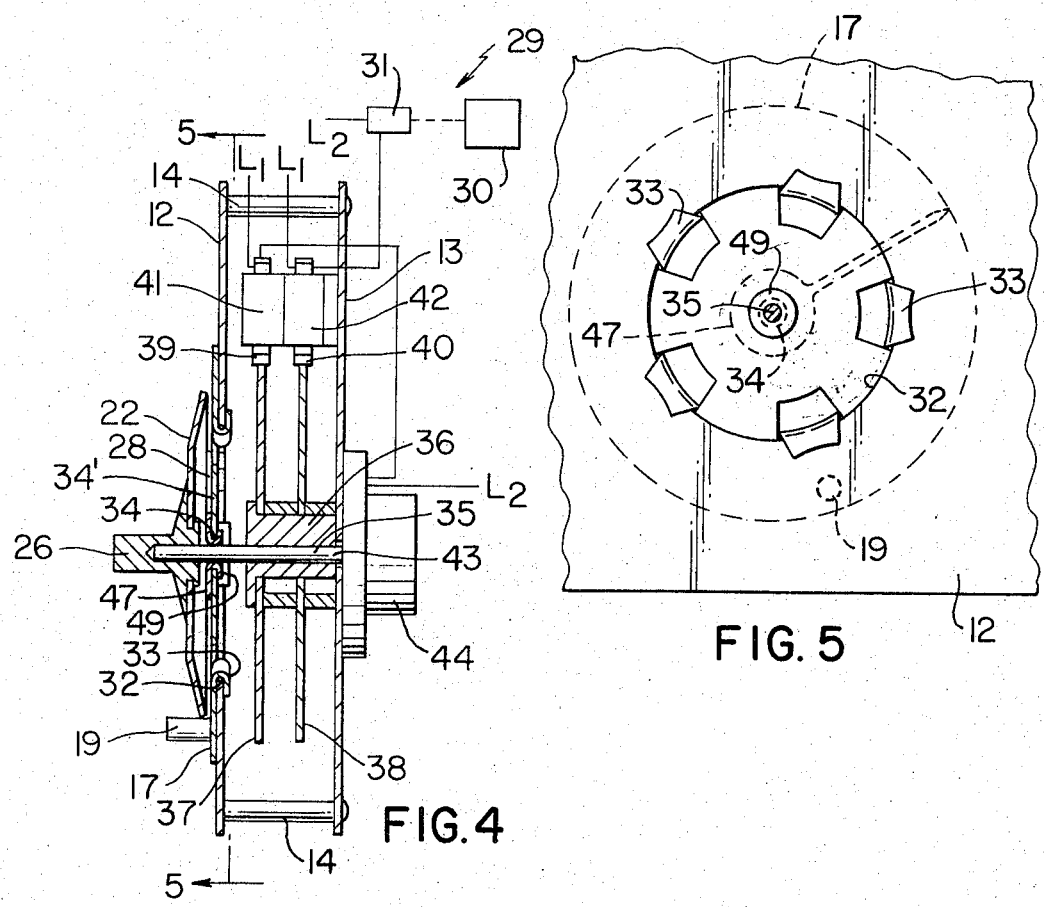
FIG. 4
FIG. 5

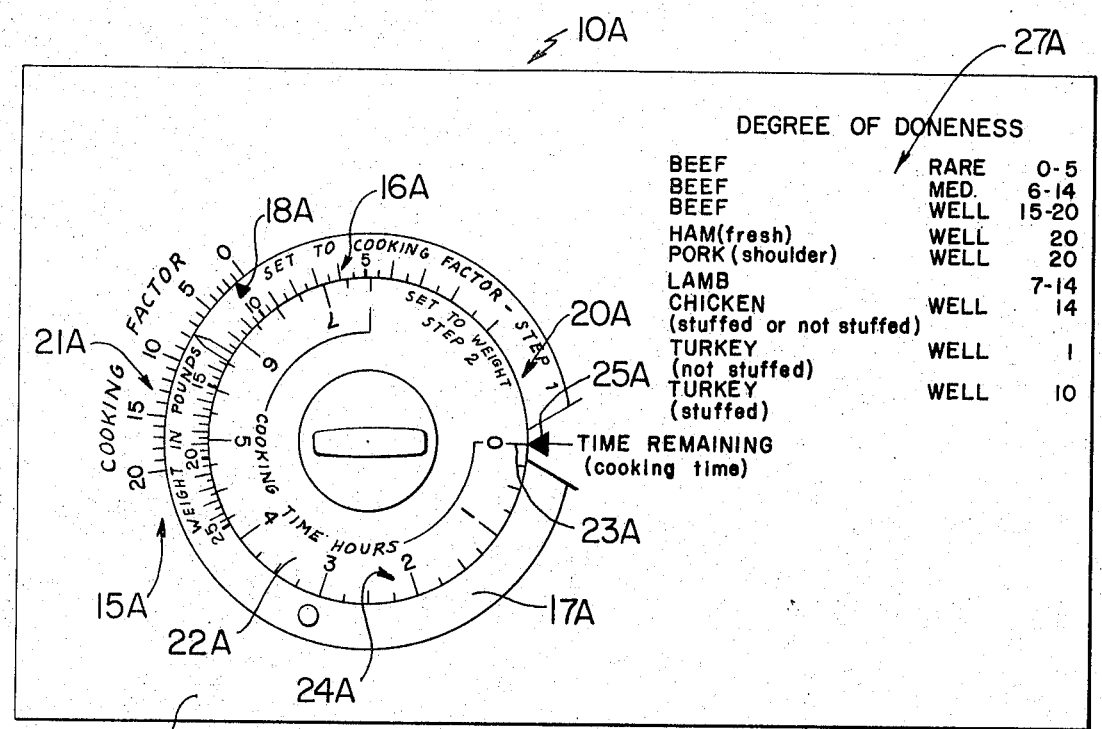
FIG. 7
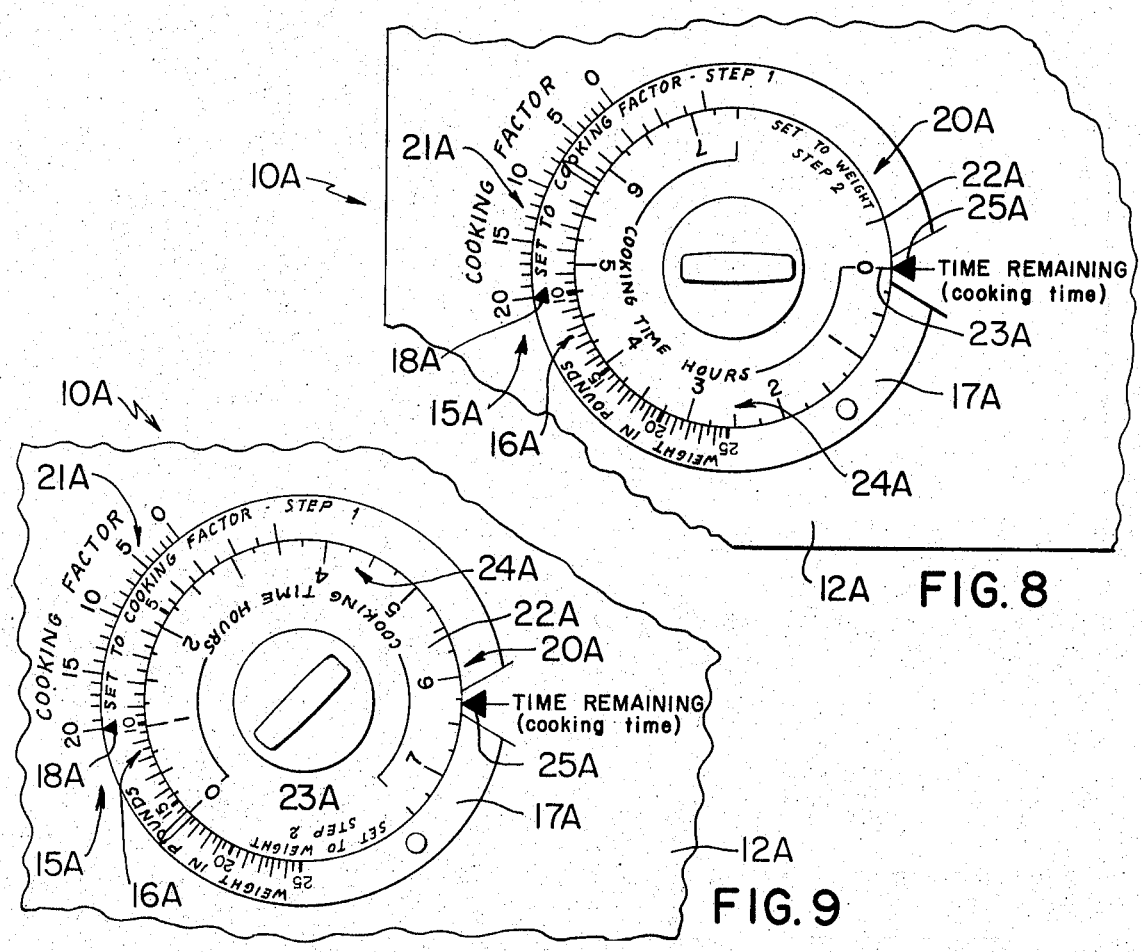
FIG. 8
FIG. 9

COMPUTER COOKING MEANS

This invention relates to a cooking computer means for determining the cooking operation of a cooking apparatus as well as a cooking apparatus utilizing such a computer means or the like.

It is well known from the copending U.S. Pat. application of James R. Willson, SER. No. 111,727, filed Feb. 1, 1971, now U.S. Pat. No. 3,731,059, that a most accurate cooking of various meat items can be provided by a cooking formula for cooking all types of meat by utilizing only two variables, namely, the weight of the particular meat item to be cooked and the desired degree of doneness of that meat item, whether the desired degree of doneness relates to a range of doneness conditions for a particular meat item or to meat items of different types.

For example, such cooking formula when being utilized in connection with gaseous fuel-burning cooking apparatus provides a cooking time period in minutes as being equal to 70 times the square root of weight of the meat item plus or minus a K factor with the cooking temperature being approximately 325° F and with the K factor being the selected degree of doneness for the particular meat item. For electrically heated cooking apparatus, the cooking formula provides the cooking time period in minutes as being equal to 40 times the square root of weight of the meat item plus or minus a K factor for the desired degree of doneness for the particular meat item and with the cooking temperature being approximately 325° F.

The results of the above formula are in minutes from the time the cooking apparatus begins to cook the meat item to the time that the meat item is ready to be removed from the oven at the termination or zero position of such completed time period. However, during such cooking operation, the high cooking temperature (325° F) is terminated at a set point so that the temperature in the oven while drifting down from the high cooking temperature to a non-cooking and low holding temperature, such as 170° F, will continue to cook the meat item until the oven reaches the hold temperature of the oven, such as 170° F, which occurs at the zero or the end of the computed cooking time period. In this manner, the cooked meat item will be at the desired degree of doneness at the completion of the computed cooking time period so that if the housewife does not remove the cooked meat at this particular time, the oven will maintain the cooked meat item at a palatable temperature of 170° F or the like which is a non-cooking temperature, so that the cooked meat item can be removed from the oven any time after the elapsed computed cooking time period, such as several hours as the case may be.

For example, it has been found that for gaseous fuel-burning ovens, the automatic cut-back time for the oven temperature to the end of a computed cooking time period can be approximately 45 minutes whereas for an electrically heated oven, such automatic cut-back time can be approximately 60 minutes. The K factor of the above formula can be tailored for a particular manufacturer's oven.

In particular, for a gas oven it has been found that if the automatic cut-back time takes place 45 minutes from the zero position, a roast beef will be properly cooked for a desired doneness of "rare" if the computed cooking time period is 70 times the square root of the weight of the meat item plus 0, the beef roast will be properly cooked for a desired doneness of a middle "medium" if the computed cooking time period is 70 times the square root of the weight of the meat item plus 24 minutes, and the beef roast will be properly cooked for a desired doneness of "well" if the computed cooking time period is 70 times the square root of the weight of the meat item plus 72 minutes. Thus, it can be seen that the K factor can be scaled through such limits for variations of degree of doneness as well as for other meat types.

It is a feature of this invention to provide a cooking computer means of the above type wherein one of the input means is settable in relation to the set position of the other input means in order to provide a simplified computer cooking means of the above type.

For example, one embodiment of this invention provides a cooking computer for determining the cooking operation of a cooking apparatus, the computer having a manually settable weight input means for indicating a single selected indicated weight applicable to all meat items and corresponding to the weight of a particular meat item to be cooked. The weight input means includes a movable and settable part thereof. The computer has a manually settable second input means indicating a selected variable other than the weight of the meat operatively associated with the weight input means, the second input means including a movable and settable part thereof. The movable and settable part of one of the input means is movable and settable in relation to the set position of the movable and settable part of the other input means. The computer has a time period output means operatively associated with the input means to provide as an output, a cooking time period for the particular meat item computed as a function of both the input means. The computer can also have means for automatically indicating the computed cooking time period after the input means have been set in the desired selected positions thereof.

Accordingly, it is an object of this invention to provide an improved cooking computer means having one or more of the novel features set forth above or hereinafter shown or described.

Another object of this invention is to provide an improved cooking apparatus utilizing such a cooking computer means or the like.

Other objects, uses and advantages of this invention are apparent from a reading of this description which proceeds with reference to the accompanying drawings forming a part thereof and wherein.

FIG. 4 is a cross-sectional view taken on line 4—4 of FIG. 1 and schematically illustrating the cooking apparatus of this invention.

FIG. 5 is a fragmentary cross-sectional view taken on line 5—5 of FIG. 4.

FIG. 6 is a fragmentary, exploded perspective view illustrating the various parts of the computer means of FIG. 4.

FIGS. 7, 8 and 9 are views similar respectively to FIGS. 1, 2 and 3 and illustrate another embodiment of this invention.

Figure 1:
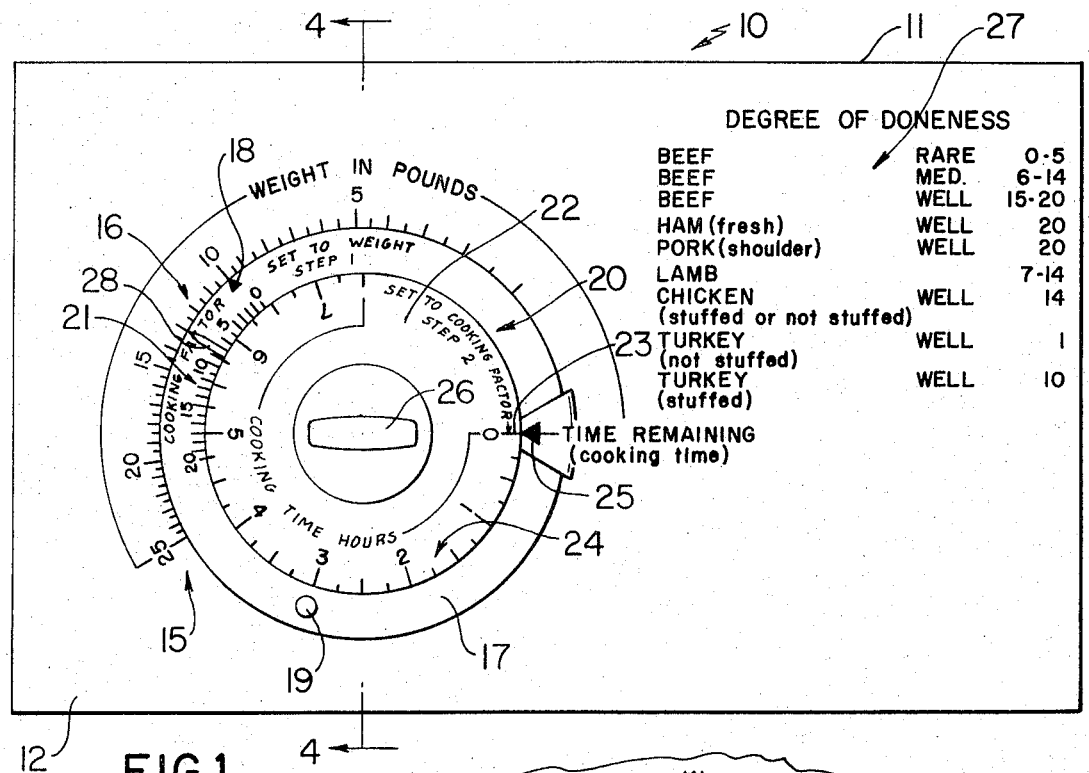
FIG. 1 is a front view of the improved cooking computer means of this invention.

While the various features of this invention are hereinafter described and illustrated as being particularly adaptable for operating a particular type of cooking apparatus, it is to be understood that the various features of this invention can be utilized singly or in any combination thereof to provide cooking computer means for other types of cooking apparatus as desired.

Further, it is to be understood that the various features of this invention can be utilized to provide a cooking computer means by itself for informational purposes, if desired, rather than in combination with a cooking apparatus.

Therefore, this invention is not to be limited to only the embodiments illustrated in the drawings, because the drawings are merely utilized to illustrate one of the wide variety of uses of this invention.

Referring now to FIG. 1, the improved cooking computer means of this invention is generally indicated by the reference numeral 10 and comprises a frame structure 11 having a front wall or control panel 12 and a rear wall or panel 13, FIG. 4, suitably held in spaced relation by post and fastening means 14.

The computer means 10 includes a first manually settable input means generally indicated by the reference numeral 15 in FIG. 1 and which comprises a stationary weight scale 16 provided on the front wall 12 of the frame 11 and a movable disk-like member 17 having a reference mark 18 thereon for being positioned against the desired weight mark on the scale 16 for the particular meat item, the disk 17 being made movable relative to the frame means 11 in a manner herinafter described and having an outwardly directed stem or handle 19 to be grasped for moving the dial or disk 17 in a manner hereinafter described.

Another input means for the computer means 10 is generally indicated by the reference numeral 20 in FIG. 1 and comprises a scale 21 disposed on the movable part or disk 17 of the first input means 15 and a movable disk or dial 22 having a reference mark 23 for being positioned adjacent the desired increment on the scale 21 after the movable part 17 of the first input means 15 has been moved to its selected position. The disk 22 also has a time scale 24 disposed thereon and adapted to register with a stationary reference mark 25 provided on the control panel 12.

The scales 16, 21 and 24 and reference marks 18, 23 and 25 are so constructed and arranged in accordance with the cooking formulas previously set forth and fully described and claimed in the aforementioned copending patent application that when the housewife desires to provide a computed cooking time for a particular meat item, she merely moves the movable part 17 of the weight input means 15 so that the reference mark 18 thereon is positioned adjacent the weight reference mark of the scale 16 that represents the exact weight of the meat item. She then grasps the knob 26 for the movable part 22 of the input means 20 to position the reference mark 23 thereof adjacent the particular cooking factor number on the scale 21, the selected cooking factor on the scale 21 being readily determined by utilizing a suitable legend 27 provided on the front wall 12 of the computer means 10 to guide the housewife in selecting the desired degree of doneness for the particular meat type for the input means 20. By thus moving the reference mark 23 on the dial 22 to the desired K factor on the scale 21, the time scale 24 has been so positioned relative to the stationary reference mark 25 that the same will indicate the computed cooking time period that that particular meat item must be cooked in an oven set for 325° F and which has an automatic fixed cut-back time of 45 minutes from the regular cooking temperature to the low warmth-retaining and non-cooking temperature of 170° F so that by the time the time period reaches zero, cooking of the meat item has ceased and the same will thereafter be maintained at a palatable temperature of 170° F until removed from the oven.

Figure 2:
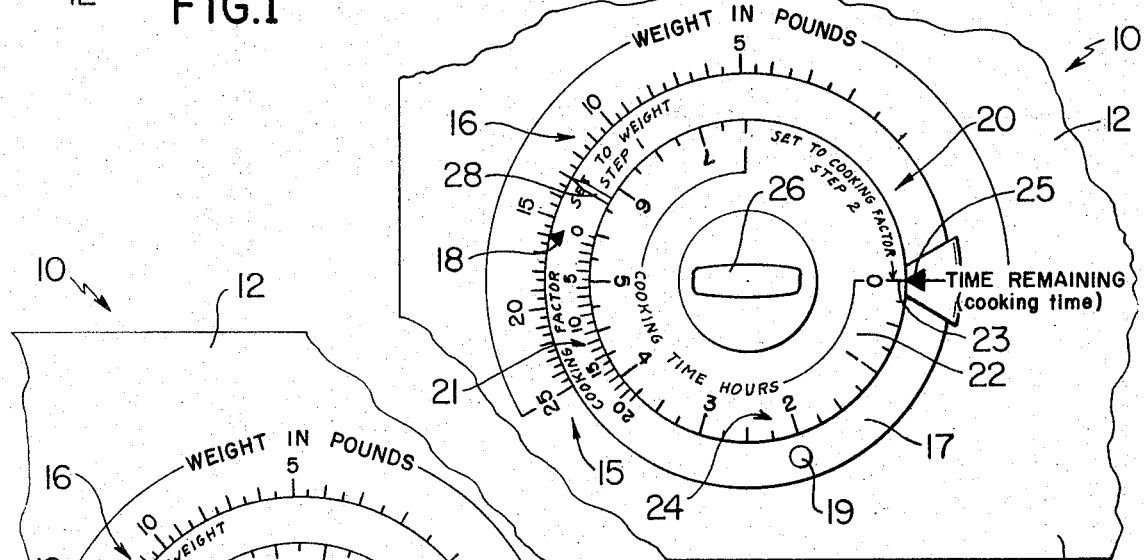
FIG. 2 is a fragmentary view similar to FIG. 1 and illustrates the cooking computer means having the first input means thereof moved to a selected position thereof.
Figure 3:
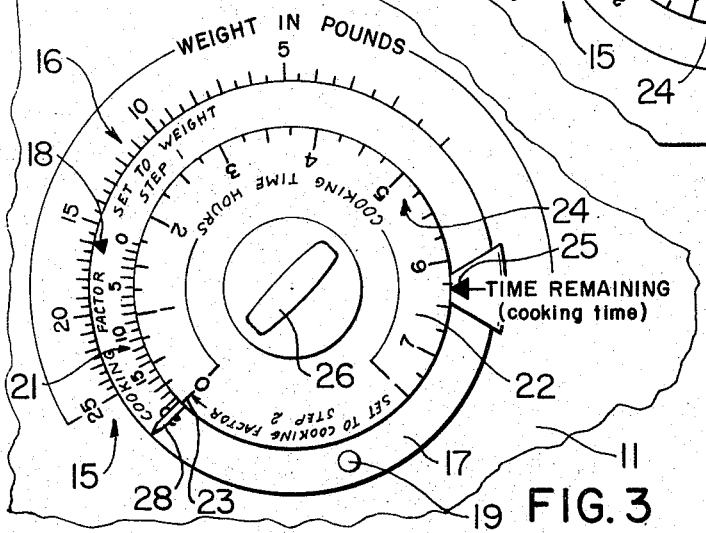
FIG. 3 is a view similar to FIG. 2 and illustrates the second input means of the cooking computer means moved to the selected position thereof for providing an indicated computed cooking time period for a particular meat item.

For example, in the embodiments illustrated in FIGS. 2 and 3, the weight input means 16 has been set for a 16 pound ham because the reference mark 18 on the dial 17 has been positioned against the 16 weight mark on the weight scale 16 as illustrated in FIG. 2. The housewife has decided to cook the ham at the recommended well done K factor setting of 20 so that the reference mark 23 on the movable part 22 of the doneness input means is now moved in the manner illustrated in FIG. 3 to such position. If desired, a movable pointer 28 can be positioned at the particular K factor number selected by the housewife so that after the particular meat item has been cooked, she can check and see that if the same is done to her desired degree of doneness, then she can see exactly what K factor she has utilized for future use. In any event, once the movable part 22 of the input means 20 has been moved to its selected K factor, it can be seen that the computed cooking time period is provided by the reference mark 25 indicating such time period on the time scale 24 which, in the example given in FIG. 3, is approximately 6 hours and 15 minutes from start to end of the cooking operation of the oven as will be apparent hereinafter.

Thus, it can be seen that the cooking computer means 10 of this invention can be utilized merely as a reference device to provide information as to how long a particular meat item should be cooked in an oven at 325° F with an automatic cut-back of temperature at 45 minutes before the computed cooking time period reaches its zero position.

However, in the embodiment of the cooking computer means 10 of this invention, the cooking computer means 10 is utilized as a computer controller means for controlling the cooking operation of a cooking apparatus generally indicated by the reference numeral 29 in FIG. 4 and comprising an oven 30 having a gaseous fuel burning burner means (not shown) controlled by a controller 31 that causes fuel to be supplied to such burner means in a cycling manner so that the temperature in the oven will be maintained at the temperature set by the controller 31. Such controller 31 is well known in the art and reference is made to U.S. Pat. No. 3,341,119 for the details thereof. Also, the control 31 has a heat motor therein which when energized will automatically reduce the effective temperature setting of the control 31 to non-cooking and warmth-retaining temperature position thereof so that the control 31 will thereafter maintain the temperature in the oven 30 at the non-cooking and warmth-retaining temperature, such as 170° F, until the housewife turns the control 31 to its "off" position.

The heat motor of control 31 is an electrically operated heat motor arrangement such that when the heat motor is electrically energized, the same will cause the control 31 to be set in its low and non-cooking temperature position.

Therefore, the details of the control 31 and operation of the oven for the cooking apparatus 29 need not be further described as the same are well known in the art as provided by the aforementioned U.S. Pat. No. 3,341,119.

As illustrated in FIGS. 4, 5 and 6, the front wall 12 of the frame means 11 has a circular opening 32 passing therethrough and around which carved out tongues 33 of the disk or dial 17 are bent in the manner illustrated in FIGS. 4 and 5 to rotatably mount such disk 17 to the front wall 12 of the frame means 11. The disk 17 has a central opening 34 passing therethrough and loosely receiving a control shaft 35 that is secured to the knob 26 of the other dial or disk 22. However, the disk 17 carries a bearing means 34' coaxial with its opening 34 for rotatably mounting the left-hand end of the shaft 35 in the frame means 11 in the manner illustrated in FIG. 4.

The shaft 35 has fixed thereon a hub 36 on which are fixed in spaced relation two cam disks 37 and 38 respectively operable against plungers 39 and 40 of electrical switches 41 and 42 utilized for a purpose hereinafter described and being carried by the frame means 11.

The right-hand end 43 of the shaft 35 is journaled in a suitable opening (not shown) of an electrical motor timer motor 44 fastened to the rear plate 13 of the frame means 11 of the computer 10 and is coupled to the output shaft of the timer motor 44 through a suitable clutching arrangement so that the shaft 35 can be rotated relative to the output shaft of the motor 44, but when the output shaft of the motor 44 is being driven by the motor 44, the same is coupled to the shaft 35 to cause the same to rotate in unison therewith.

The cam disk 38 has a dropoff point 45 as illustrated in FIG. 6 and when such dropoff point 45 is reached, the switch plunger 40 is permitted to move outwardly and thereby cause the switch 42 to interconnect a power source lead $L_1$ to the control device 31 so that the heat motor thereof is energized by being placed across the power source leads $L_1$ and $L_2$ as schematically illustrated in FIG. 4 to cause the heat motor of the controller 31 to reduce the effective temperature setting thereof to the low temperature of 170° F or the like.

The cam disk 37 has a cutout area 46 such that when the same is reached by the plunger 39 of the switch 41, the plunger 39 moves outwardly and disconnects the power source lead $L_1$ from the timer motor 44 so that the timer motor 44 is no longer placed across power source leads $L_1$ and $L_2$ and, thus, stops driving the shaft 35. Thus, as long as the shaft 35 has been turned to a position where the plunger 39 of the switch 41 rides on the high side of the disk 37, the timer motor 44 is placed across the power source leads $L_1$ and $L_2$ and will continuously drive the shaft 35 in a clockwise direction in FIG. 6 until the plunger 39 of the switch 41 moves outwardly when the cutout 46 in the cam disk 37 reaches the plunger 39 to thereby terminate the operation of the timer motor 44 and, thus, rotational movement of the shaft 35. This position of the disk 37, of course, is when the zero time on the scale 24 reaches the reference mark 25 of the control panel 12 in the position illustrated in FIG. 1.

The pointer 28 can have a hub part 47 provided with an opening 48 passing therethrough to loosely receive the shaft 35 as illustrated in FIG. 4 and have an inner peripheral portion 49 thereof inwardly turned through the opening 34 in the disk 17 to rotatably mount the pointer 28 relative to the disk 17 so that the same can be positioned in the manner previously described for permanent indication purposes and will not turn with the shaft 35.

The operation of the cooking apparatus 29 utilizing the cooking computer means 10 of this invention will now be described.

As previously stated, the housewife first moves the movable part 17 of the weight input means 15 to position the reference mark 18 relative to the weight scale 16 adjacent the weight mark thereon that represents the actual weight of the meat item to be cooked in the oven 30. Thereafter, the housewife moves the movable part 22 of the input means 20 to position the reference mark 23 thereof adjacent the desired reference mark on the K scale 21 for the desired degree of doneness or meat type whereby the stationary reference 25 will indicate on the time scale 24 the cooking time required for such two input settings of the computer means 10. With the control 31 set at 325° for operating the oven 30, the cam disks 37 and 38 have been so rotated by the shaft 35 when the movable part 22 has been set with its reference mark 23 against the desired K factor on its scale 21, that the timer motor 44 now begins to operate and will continuously rotate the shaft 35 back to its zero position in a clockwise direction in FIG. 3 which, in the example given, will take approximately 6 hours and 15 minutes. During such time, the cam disk 38 is maintaining the plunger 40 of the switch 42 in its "in" position so that the control 31 is maintaining the temperature in the oven 30 at the 325° F cooking temperature. However, when the time remaining on the cooking computer 10 reaches approximately 45 minutes before the "zero" reaches the reference mark 25, the drop-off portion 45 of the cam 38 permits the plunger 40 of switch 42 to move outwardly and thereby operate the heat motor of the control 31 to cause the same to reduce its effective temperature setting to approximately 170° F. Thus, by the time the zero position on the scale 24 reaches the reference mark 25, no further cooking of the meat item in the oven 30 takes place and the control 31 will continue to maintain the temperature in the oven 30 at approximately 170° F so that no further cooking of the meat item takes place but the same will remain at a palatable temperature for any desired length of time that the meat remains in the oven 30. However, at the time the zero mark on the scale 24 reaches the reference mark 25, the cutout 46 in the cam disk 34 is now adjacent the plunger 39 on the switch 41 so that the plunger 39 moves outwardly and terminates the operation of the motor 44 so that the control shaft 35 now remains in the position illustrated in FIG. 1. Thus, the computer means 10 is now in its "off" position. Subsequently, when the housewife sees the zero on the time scale 24 is adjacent the stationary reference mark 25, she can open the oven 30 and remove the meat therefrom.

Therefore, it can be seen that this invention not only provides an improved cooking computer means utilizing the formula means of the aforementioned copending patent application to provide an accurate cooking time, but also this invention provides a cooking apparatus utilizing such improved computer cooking means.

While the cooking computer means 10 of this invention has been previously described as having the weight input means 15 being set first and then having the other variable being set by the input means 20, it is to be understood that the same could be reversed so that the first input means to be set would comprise the selection of the cooking factor and then the weight input means would be set to provide the selection of the weight of the meat item with the result still being the same in that a computed cooking time period would still be provided according to the aforementioned formulas.

For example, reference is now made to FIGS. 7, 8 and 9 wherein parts thereof similar to the computer 10 previously described are indicated by like reference numerals followed by the reference letter "A."

As illustrated in FIGS. 7, 8 and 9, the cooking computer means 10A is substantially identical to the computer means 10 previously described except that the input means 15A now comprises a stationary scale 21A indicating the K factor for doneness and meat type and being disposed on the control panel 12A. Thus, the movable part 17A of the first input means 15A includes the reference mark 18A to be set adjacent the desired K factor on the scale 21A. Also, there is disposed on the movable part 17A of the input means 15A, a weight scale 16A and against which the reference point 23A of the movable part 22A of the second input means 20A is to be positioned to insert the proper weight for a particular meat item in the computer 10A. Thus, it can be seen that the housewife or the like first moves the movable part 17A of the first input means 15A to position the reference mark 18A adjacent the desired K factor on the stationary scale 21A as illustrated in FIG. 8. Thereafter, the housewife moves the movable dial 22A of the second input means 20A to position the reference mark 23A thereof adjacent the weight scale 16A to indicate the actual weight of the meat item to be cooked as illustrated in FIG. 9 so that the time scale 24A will now indicate adjacent the stationary reference mark 25A the cooking time required for such meat item.

The cooking computer means 10A of this invention then can be utilized to operate its cooking apparatus in the same manner as the computer means 10 previously described and need not be further described. Thus, it can be seen that another cooking computer means of this invention is provided in FIGS. 7-9.

While the form of the invention now preferred has been illustrated and described as required by the patent statutes, other forms may be utilized, all coming within the scope of the appended claims.

What is claimed is:

1. A cooking computer for determining the cooking operation of a cooking apparatus, said computer having a manually settable weight input means for indicating a single selected indicated weight applicable to all meat items and corresponding to the weight of a particular meat item to be cooked, said weight input means including a movable and settable part thereof, said computer having a manually settable second input means indicating a selected variable other than the weight of the meat operatively associated with said weight input means, said second input means including a movable and settable part thereof, and said computer having a time period output means operatively associated with said input means to provide as an output a cooking time period for said particular meat item computed as a function from both of said input means, the movable and settable part of one of said input means being movable and settable only after the movable and settable part of the other input means has been set so as to be set in relation to the set position of the movable and settable part of the other input means whereby the movable and settable part of said other input means must first be set in the desired position thereof before the movable and settable part of said one input means can be set in its desired position relative to the set position of the movable and settable part of said other input means, said one input means including a stationary scale and said movable and settable part thereof including a reference indicator thereon that is to be positioned adjacent the desired setting on said stationary scale to provide for the selection of said one input means, said movable and settable part of said one input means including another scale thereon whereby said other scale is positioned relative to said computer when said movable and settable part of said one input means is being set in its desired position relative to its stationary scale, said movable and settable part of said other input means including a reference indicator thereon that is to be positioned adjacent the desired setting on said other scale to provide for the selection of said other input means once the selection of said one input means has taken place.

2. A cooking computer as set forth in claim 1 wherein said movable and settable part of said other input means has a time scale thereon, said computer having a stationary reference means registerable with said time scale whereby once said movable and settable part of said other input means has been set in a selected position thereof for a selection of said other input means the time scale thereof is so positioned relative to said stationary reference means that the indication given thereby is said computed cooking time period.

3. A cooking computer as set forth in claim 2 wherein said stationary scale is arcuate, said movable and settable part of said one input means is a rotatable disc having said reference indicator thereof disposed adjacent the outer periphery thereof and having said other scale thereof in arcuate form thereon, said movable and settable part of said other input means being a rotatable disc having said reference indicator thereof disposed adjacent the outer periphery thereof and having said time scale in arcuate form thereon.

4. A cooking computer as set forth in claim 3 wherein said one input means is said weight input means and said stationary scale is a weight scale, said other scale of said movable and settable part of said other input means is set out in selected variables other than weight whereby said other input means is said second input means.

5. A cooking computer as set forth in claim 3 wherein said one input means is said second input means and said stationary scale is set out in selected variables other than weight, said other scale of said movable and settable part of said other input means is a weight scale whereby said other input means is said weight input means.

* * * * *